(12) United States Patent
Rangarajan et al.

(10) Patent No.: US 9,306,722 B2
(45) Date of Patent: Apr. 5, 2016

(54) TRACKING RADAR FREQUENCY ENABLING MORE CHANNELS

(71) Applicant: Cisco Technology, Inc., San Jose, CA (US)

(72) Inventors: Raghuram Rangarajan, Santa Clara, CA (US); Paul Stager, Akron, OH (US); David S. Kloper, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 263 days.

(21) Appl. No.: 13/933,456

(22) Filed: Jul. 2, 2013

(65) Prior Publication Data

US 2015/0009947 A1 Jan. 8, 2015

(51) Int. Cl.
*H04W 24/08* (2009.01)
*H04L 5/00* (2006.01)
*H04L 27/00* (2006.01)

(52) U.S. Cl.
CPC ............ *H04L 5/0062* (2013.01); *H04L 5/0037* (2013.01); *H04L 5/0064* (2013.01); *H04L 27/0006* (2013.01)

(58) Field of Classification Search
USPC ............. 370/330; 455/73, 130, 423, 500, 505
See application file for complete search history.

(56) References Cited

U.S. PATENT DOCUMENTS

| | | | |
|---|---|---|---|
| 6,714,605 B2 | 3/2004 | Sugar et al. | |
| 6,850,735 B2 | 2/2005 | Sugar et al. | |
| 2002/0114270 A1* | 8/2002 | Pierzga et al. | 370/208 |
| 2006/0129410 A1* | 6/2006 | Reisenfeld et al. | 704/278 |
| 2010/0019947 A1* | 1/2010 | Kruys et al. | 342/20 |
| 2013/0021197 A1* | 1/2013 | Jiang | 342/195 |
| 2014/0079248 A1* | 3/2014 | Short et al. | 381/119 |
| 2014/0254494 A1* | 9/2014 | Clegg | 370/329 |
| 2014/0315506 A1* | 10/2014 | Rezk et al. | 455/130 |

OTHER PUBLICATIONS

U.S. Appl. No. 61/813,631, filed Apr. 18, 2013.*

* cited by examiner

*Primary Examiner* — Edan Orgad
*Assistant Examiner* — Sithu Ko
(74) *Attorney, Agent, or Firm* — Patterson & Sheridan, LLP

(57) ABSTRACT

In an example embodiment, a channel that includes a plurality of sub-channels is sampled to detect pulses indicative of a presence of a radar signal. A frequency for the radar signal is determined. If the frequency of the radar signal maps to a selected subset of the plurality of sub-channels, the selected subset of the plurality of sub-channels are determined to be unavailable due to radar, while the remaining sub-channels remain available for use. The selected subset of the plurality of sub-channels determined to be unavailable due to radar may be selectively returned for use after the radar signal is no longer detected for a predetermined selected time period.

20 Claims, 5 Drawing Sheets

```
% Constants
bigFs = 640;
Z_CRS_INT_FACT = bigFs / descBW;
taps = intfilt(Z_CRS_INT_FACT, 3, 0.95);
a2F = bigFs/pi/2;
tLen = 0.40 * bigFs - 1;
tSkip = 0.05 * bigFs;
dcLim1 = 0.125;
dcLim3 = 0.996;
dcWin = 32;
nPre = 28;
nPost= 27;
bwLim1 = 24.6;
bwLim2 = 28.9;
tGate = 548;
tGate2 = 64;
% Extract samples around trigger point
i2 = min(nPre, tdPre(i1));
i3 = min(nPost,tdDur(i1));
s0 = zeros(1, nPre+nPost);
s0(1, nPre-i2+1 : nPre+i3) = iq(tdSamp(i1)-i2+1 : tdSamp(i1)+i3); s0=s0';
% Interpolation filter
s0 = [s0 zeros(length(s0),Z_CRS_INT_FACT-1)]'; s0 = s0(:);
s0 = conv(taps, s0);
s1 = s0(Z_CRS_INT_FACT*5:end-Z_CRS_INT_FACT*6+1);
% Measure frequency estimate between interpolated samples
s2 = angle(s1(2:end).*conj(s1(1:end-1))).*a2F;
% Gating pulse from DC before & after the pulse
s4x1(1:length(s2)) = -1;
s4d(1:length(s2)) = 2;
for i9=1+dcWin:length(s2)-dcWin+1
    if abs(mean(s2(i9-dcWin:i9+dcWin-1))) < dcLim1
        s4x1(i9) = max(1, s4x1(i9-1)+1);
        s4d(i9) = abs(mean(s1(i9-dcWin:i9+dcWin-1))) / mean(abs(s1(i9-dcWin:i9+dcWin-1)
    end
end
s4x3=find(s4x1>=3) - 1;
s4x4=find(s4d(s4x3) < dcLim3);
s2(s4x3(s4x4)) = bigFs;
```

FIG. 8A
MAP TO FIG. 8B

FIG. 8B
MAP TO FIG. 8A

```
% Power gating for more accurate Start of Pulse
lvl = min(max(max(abs(s1)) * 0.5, .25), 0.4);
i8 = find(abs(s1)>lvl);
if length(i8) == 0 || i8(1) == 1
    rc(2) = rc(2) + 1;
    continue;
end
i8 = i8(1);
i9 = min(length(s1)-1, i8 + tGate);
s1 = s1(max(2, i8-tGate2) : i9);
s2 = s2(max(2, i8-tGate2) : i9);
% Find window with clean frequency estimates
s4 = 0;
s4c(1:length(s2)) = -1;
for i9=2:length(s2)-tLen
    if max(s2(i9:i9+tLen)) - min(s2(i9:i9+tLen)) > bwLim1 || max(abs(s2(i9:i9+tLen))) > bwLim2
        s4(i9) = -1;
    else
        s4(i9) = max(1, s4(i9-1)+1);
        s4c0(i9) = mean(s2(i9+tSkip:i9+tLen-tSkip));
        s4c(i9) = abs(s4c0(i9) + ((descCF - trueCF) * 0 + 40));
    end
end
% Select best estimate
ii2 = find(s4==10);
if length(ii2) > 0
    [val,ii] = max(s4(ii2(end):end));
    ii = ii + ii2(end) - 1;
    i9 = ii-5;
    FreqEst = s4c0(i9) + descCF - trueCF;
end
```

TRACKING RADAR FREQUENCY ENABLING MORE CHANNELS

TECHNICAL FIELD

The present disclosure relates generally to wireless networking and, more particularly, to bandwidth administration and processing after detection of a primary user by a secondary user on one or more sub-channels.

BACKGROUND

Many techniques are available for increasing the physical (PHY) layer throughput of wireless networks. One technique is to increase the bandwidth of a channel, for example from 20 Mhz to 40 Mhz, etc. However, in some frequency bands, the ability of a secondary user to use a channel may be constrained by whether the secondary user can detect whether a primary user (e.g., radar) is present. If the primary user is present, then the secondary user cannot use the channel.

BRIEF DESCRIPTION OF THE DRAWINGS

The accompanying drawings incorporated herein and forming a part of the specification illustrate the example embodiments.

FIGS. 8A and 8B illustrate an example of a MATLAB code for implementing an example embodiment.

OVERVIEW OF EXAMPLE EMBODIMENTS

Figure 1:
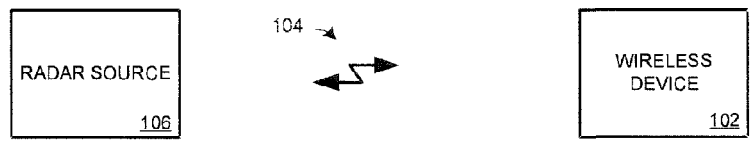
FIG. 1 is a block diagram illustrating an example of a wireless device operable to detect a primary user and determine a frequency being used by the primary user.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein logic encoded in a tangible, non-transitory computer readable medium for execution and when executed operable to select a wide band channel comprising a plurality of sub-channels. The logic is further operable to select a wide band channel comprising a plurality of sub-channels. The logic is still further operable to detect a primary user on the wide band channel, and to map the detected primary user to a first sub-channel of the plurality of sub-channels in accordance with a frequency of the primary user. The logic is yet still further to enable communication on a selected second sub-channel of the plurality of sub-channels that does not include the frequency of the primary user. The logic is operable to determine a frequency of the radar signal. The logic is further operable to map the frequency of the radar signal to a sub-channel, and selectively communicate on a sub-channel selected from the plurality of sub-channels that does not include the frequency of the radar signal.

In accordance with an example embodiment, there is disclosed herein an apparatus comprising a wireless transceiver, and radar detection logic operably coupled with the wireless receiver and operable to obtain data representative of samples of a channel that contains a plurality of sub-channels. The radar detection logic is operable to select a time period having samples indicative of radar pulses. The radar detection logic is further operable to determine a frequency of a radar signal associated with the pulses. The radar detection logic is still further operable to map the frequency of the radar signal to a sub-channel, wherein the wireless transceiver selectively communicates on at least one sub-channel selected from the plurality of sub-channels that does not include the frequency of the radar signal.

In accordance with an example embodiment, there is disclosed herein a method comprising obtaining a plurality of samples for a channel, the channel containing a plurality of sub-channels. The method further comprises determining whether a radar signal is present on a wideband channel, and if a radar signal is determined to be present on the wideband channel, to then determine the frequency of the radar. In accordance with an example embodiment, interpolation is performed on the samples to obtain a plurality of interpolated samples. Power gating is performed to find a start of a pulse. Angles are calculated between the interpolated samples. An angle associated with the mean of a plurality of angles between samples is converted to a frequency of a radar associated with the pulses. The example embodiments herein provide additional processing such as, for example, bandwidth and/or channel processing once radar is detected so as to enable further functionality. The frequency of the radar associated with the pulses is mapped to a first sub-channel comprising the wideband channel. Communication is prevented or otherwise unavailable on the first sub-channel and is enabled or otherwise permitted on at least one sub-channel selected from the plurality of sub-channels that does not include the frequency of the radar signal.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, the presence of radar is detected and the frequency of the radar is determined. Signal processing techniques are applied to the I/Q samples captured from the radar detection pulses, to determine the frequency of a radar.

When radar is detected relative to a sub-channel of the plurality of sub-channels comprising the wideband channel, data representative of the sub-channel affected by radar among the plurality of sub-channels comprising the wideband channel is provided to a wireless controller. The wireless controller then acts accordingly. For example, the wireless controller may move to a different channel or pick a bandwidth and sub-channels that does not contain the sub-channel affected by radar. For example, for a 160 MHz channel containing eight 20 MHz sub-channels (which may be combined into larger sub-channels such as four 40 MHz sub-channels or two 80 MHz sub-channels), there may be up to 140 MHz of available bandwidth (160–20 for the affected channel). By way of a particular example, in the case of 802.11ac and with reference to FIG. 5 for example, although the full 160 MHz channel is no longer available owing to the presence of a radar signal found on one of the sub-channels, the following sub-channels remain available: 1×80 MHz channel, 3×40 MHz channels, and 7×20 MHz channels. These remain available for use without impacting the primary user or any of the one or more secondary users. The remaining available sub-channels, by way of example, are marked in FIG. 5 with an asterisk.

Although in the example embodiment a wireless controller may move to a different channel or pick a bandwidth and one or more sub-channels that do not contain the sub-channel affected by radar, it is to be appreciated that the embodiments herein are not limited to wireless devices commonly known as "WiFi" devices, but that the embodiments are useful in any communication systems or technologies where avoidance of operation in a band being used by radar is desired including for example with devices using wireless canopy technology for example and others. Embodiments herein further extend to communication protocol interference avoidance wherein a controller may move to a different channel or pick a different protocol or one or more sub-channel protocols that do not contain an identified protocol to be avoided, protected, or the like.

FIG. 1 is a block diagram illustrating an example embodiment of a wireless device 102 operable to detect a primary user on a wideband channel, and further operable to determine the frequency of the wideband channel used by the primary user. The primary user may be a radar signal and the frequency determined as being used by the primary user may be a radar frequency. In an example embodiment, the wireless device 102 is operable to communicate on a wideband channel that contains a plurality of sub-channels. The sub-channels may have any physically realizable bandwidth (e.g., 5 Mhz, 10 MHz, 20 MHz, etc.). When the wireless device 102 detects a signal (such as a radar signal) 104 from a primary user of a spectrum (for example a radar) 106, the wireless device is operable to determine the frequency of the signal 104. If the wireless device 104 determines that the frequency of the signal 104 maps to one of the plurality of sub-channels, the wireless device does not use the affected sub-channel, but instead may selectively communicate on one or more of the other remaining sub-channels other than the affected sub-channel.

Figure 2:
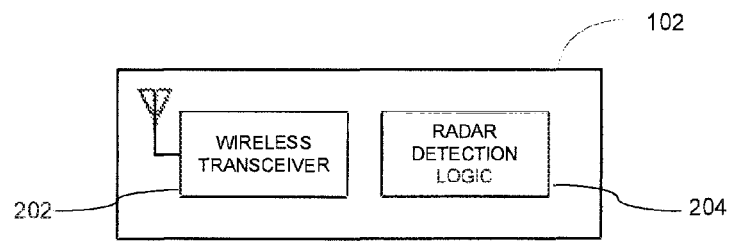
FIG. 2 is a block diagram of an apparatus that detects a primary user such as radar and the frequency that the radar is operating.

FIG. 2 is a block diagram of the apparatus 102 that detects radar and the frequency that the radar is operating. The apparatus 102 comprises a wireless receiver 202 that can receive wireless signals, including the radar signals coupled with radar detection logic 204. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, the radar detection logic 204 selects a wide band channel comprising a plurality of sub-channels. The radar detection logic 204 obtains data representative of a plurality of samples indicative of a radar signal for the wide band channel. The radar detection logic 204 determines a frequency of the radar signal and maps the frequency of the radar signal to a sub-channel. The wireless transceiver 202 is operable to selectively communicate on a sub-channel selected from the plurality of sub-channels that does not include the frequency of the radar signal detected by the radar detection logic 204.

In an example embodiment, the radar detection logic 204 includes an interpolation filter and is further operable to employ the interpolation filter to receive a number of samples (e.g., X samples at 20 Msps) and replace the number of samples with a number of interpolated samples (e.g., 32X samples at 640 Msps), none of which would exactly match the original samples which did not have the same filtering applied, and might have an amplitude shift. The radar detection logic is still further operable to obtain a mean of angles between samples to determine the frequency of the radar signal.

In an example embodiment, the radar detection logic 204 is further operable to determine whether the frequency of the radar signal is within a predetermined limit of an adjacent sub-channel. If the frequency of the radar signal is within a predetermined limit (e.g., within an estimated error of the algorithm employed in determining the frequency of the radar signal), the allowed channels for wireless transceiver 202 does not include the adjacent channel. Alternatively, in accordance with a further example embodiment, this limit includes a guard spacing such as, for example, a frequency guard spacing, so as to further protect the primary user account for various minor discrepancies such as, for example, the transmit spectral mask of the detecting device falling below a desired level, the width of the radar signal, or the like.

In an example embodiment, the radar detection logic 204 is further operable to calculate interpolated samples. In an example embodiment, the interpolated samples are selectively limited to a time period of particular interest (e.g., a time period where the start of a pulse indicative of a radar signal is detected). Interpolation changes the sampling period in time domain to a finer granularity (interpolating intermediate points). In an example embodiment, the interpolation is not necessarily a straight line. For example three points to the left and the right of an interpolated sample point can be employed as necessary or desired.

Figure 3:
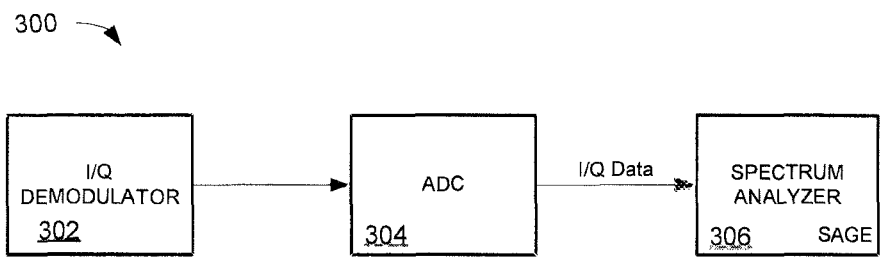
FIG. 3 is a block diagram illustrating a detailed example of an apparatus that detects a primary user such as radar and the frequency that the radar is operating.

The radar detection logic 204 is further operable to perform power gating to search for the start of a pulse that is saturating the ADC (not shown, see e.g., FIG. 3). This power gating advantageously selects a search window, shortly after the pulse begins which should be representative of its frequency, especially for short pulse widths. The radar detection logic 204 is operative to search for a clean window during a predetermined time period from the start of the pulse (e.g., the first 0.5 microseconds). In the example embodiment and for purposes of the descriptions thereof, a "clean window" is an area of the pulse where the measured angle between samples (frequency estimation) remains within the channel bandwidth.

FIG. 3 is a block diagram illustrating a detailed example of an apparatus 300 in accordance with an example embodiment configured to detect a radar signal and to determine the frequency that the radar is operating. The apparatus 300 comprises a complex (I/Q) demodulator 302 for demodulating wireless signals. The demodulated wireless signals are provided to an analog to digital converter (ADC) 304. The digitized I/Q data from the ADC 304 is provided to a radar detection circuits 306, such as those included in SAgE (available from Cisco Systems, Inc., 170 West Tasman Dr., San Jose, Calif. 95134).

In an example embodiment, the spectrum analyzer 306 is operable to select a wide band channel comprising a plurality of sub-channels. The spectrum analyzer 306 further obtains data representative of a plurality of samples (I/Q) indicative of a radar signal for the wide band channel. The spectrum analyzer 306 is further configured to determine a frequency of the radar signal and maps the frequency of the radar signal to a sub-channel.

In an example embodiment, the spectrum analyzer 306 is further operable to calculate a mean of angles between the plurality of samples. The mean of the angles are selectively used in determining the frequency of the detected radar signal.

In an example embodiment, the spectrum analyzer 306 is further operable to determine whether the frequency of the detected radar signal is within a predetermined limit of an adjacent sub-channel. If the frequency of the detected radar signal is within a predetermined limit (e.g., within an estimated error of the algorithm employed in determining the frequency of the radar signal), radar is determined to be present on the adjacent channel too.

In an example embodiment, the spectrum analyzer 306 calculates interpolated samples. The interpolated samples may be limited to a time period of particular interest (e.g., a time period where pulses indicative of a radar signal are detected). Interpolation changes the sampling period in time domain to a finer granularity (interpolating intermediate points). For example, if samples are taken at 50 nS (20 Msps), interpolating 31 intermediate points results in the equivalent of samples at 1.56 nS (640 Msps). In an example embodiment, the interpolation is not necessarily a straight line. For example, three points to the left and the right of an interpolated sample point can be employed as necessary or desired. Advantageously, in the example embodiment, none of the resulting interpolated points need to exactly match the original samples.

The spectrum analyzer 306 is further operable to perform power gating to find the start of a pulse that is saturating the ADC 304. The spectrum analyzer 306 searches for a clean window during a predetermined time period from the start of the pulse (e.g., the first 0.5 microseconds). A "clean window" is an area of the pulse where the measured angle between samples (frequency estimation) is within an expected bandwidth.

The spectrum analyzer 306 is operable to calculate a mean of the plurality of angles between a plurality of I/Q samples is computed. In the case of a radar using pulse widths that are so short that the ADC 304 never comes out of saturation during the duration for the pulse, the angle (frequency) between the interpolated samples tend to oscillate around the angle (frequency) of the radar signal. In accordance with the example embodiment, a resulting angle (frequency) is identified using suitable filtering or the like, wherein the resulting angle (frequency) is representative of the underlying radar signal.

Although the examples illustrated in FIGS. 2 and 3 are directed to an apparatus with both a wireless transceiver and logic that detects a radar signal and computes the frequency of a detected radar signal (e.g., radar detection logic 204 in FIG. 2 and/or spectrum analyzer 306 in FIG. 3), those skilled in the art should readily appreciate that these components may be located in separate apparatuses. For example, the wireless transceiver may be located in the RF (radio frequency) section of an access point (AP) at one location and communicatively coupled to a wireless LAN (local area network) controller, switch, or any other device, where the logic for determining the radar frequency is located.

Figure 4:
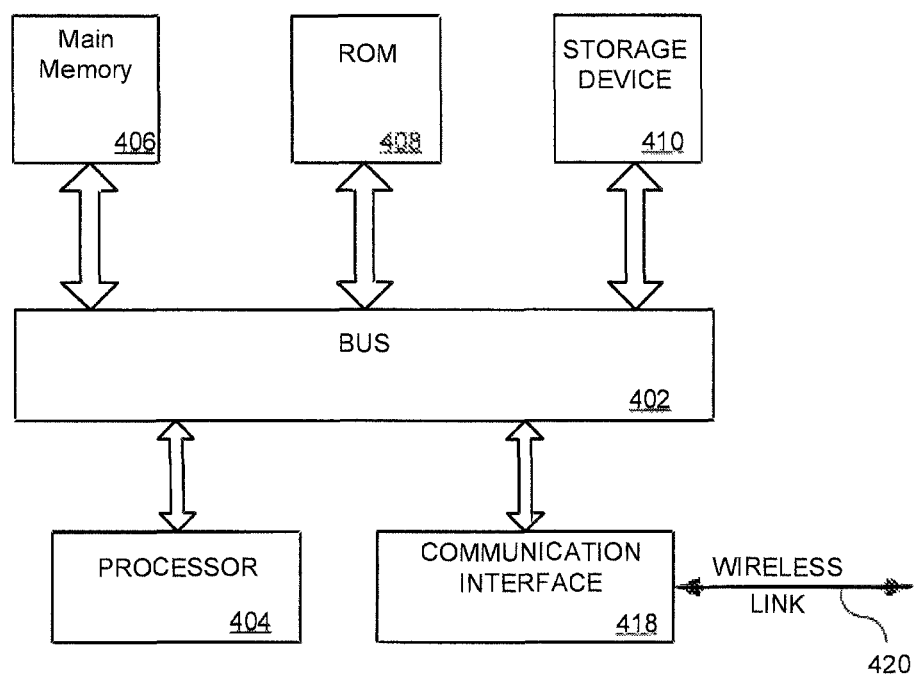
FIG. 4 is a block diagram illustrating an example of a computer system upon which an example embodiment can be implemented.

FIG. 4 is a block diagram that illustrates a computer system 400 upon which an example embodiment may be implemented. Computer system 400 is suitable for implementing the radar detection logic 204 (FIG. 2) and/or spectrum analyzer 306 (FIG. 3).

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, and/or flash storage, is provided and coupled to bus 402 for storing information and instructions.

An aspect of the example embodiment is related to the use of computer system 400 for tracking a radar frequency. According to an example embodiment, tracking a radar frequency is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 404 for execution. Such a medium may take many forms, including but not limited to non-volatile media, and volatile media. Non-volatile media include for example optical or magnetic disks, such as storage device 410. Volatile media include dynamic memory such as main memory 406. As used herein, tangible media may include any non-transitory media such as a volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 400 also includes a communication interface 418 coupled to bus 402. Communication interface 418 provides a two-way data communication coupling computer system 400 to a communication link 420. In an example embodiment, communication link 420 is a wireless link enabling computer system 400 to monitor a channel for radar signals.

Figure 5:
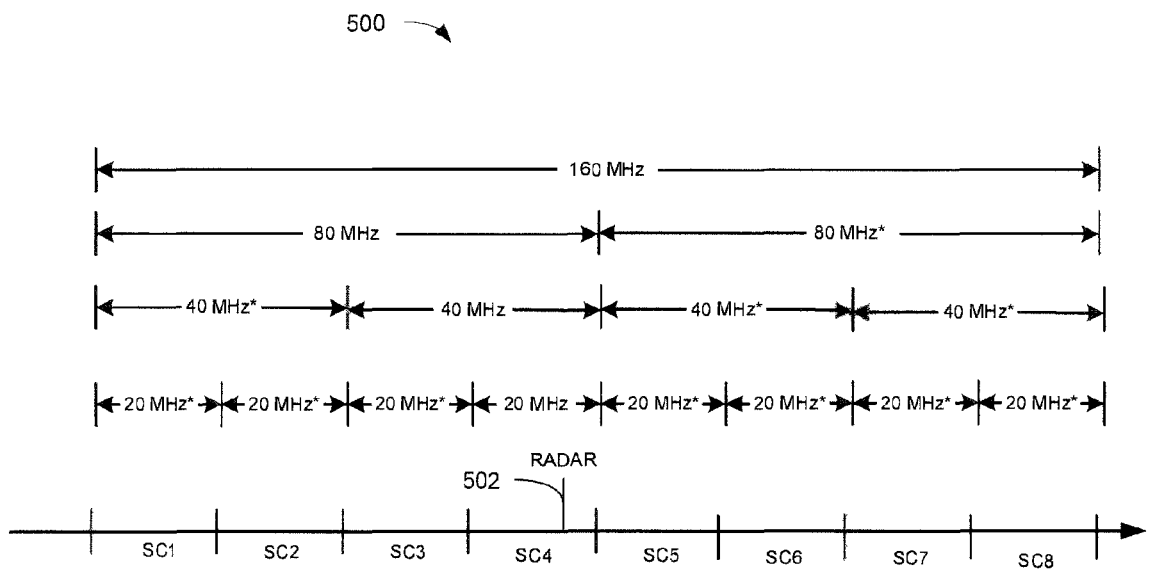
FIG. 5 is an example of a frequency spectrum illustrating a wideband channel containing a plurality of sub-channels.

FIG. 5 is an example of a frequency spectrum 500 illustrating a wideband channel containing a plurality of sub-channels. The example of FIG. 5 illustrates a wideband channel of 160 MHz. The wideband channel may suitably comprise two 80 MHz sub-channels, four 40 MHz sub-channels, eight 20 MHz sub-channels, SC1, SC2, SC3, SC4, SC5, SC6, SC7, and SC8, or any appropriate combination of 20 MHz, 40 Mhz, and/or 80 MHz channels. In the illustrated example, a radar 502 signal is detected in sub-channel SC4. Thus, sub-channel SC4 is removed from the list of available channels, leaving sub-channels SC1-SC3 and SC5-SC8 available among the set of eight 20 MHz sub-channels. The sub-channel SC4 being removed from the list of available channels or otherwise disabled etc., can allow for an 80 MHz and a 60 MHz channel, three 40 MHz and a 20 MHz channel, seven 20 MHz channels, or any and all other combinations and permutations of 20 MHz, 40 MHz, and/or 80 MHz channels within the wideband channel of 160 MHz and excepting the disabled/removed sub-channel SC4 with the radar signal present or detected.

In an example embodiment, if the resolution error of the algorithm used to determine the frequency of radar signal 502 is less than the distance between the calculated frequency and the edge of SC5, then SC5 would also be removed from the list of available channels. Sub-channels SC1-SC3 and SC6-SC8 would be the available sub-channels, with 120 MHz of bandwidth, with the widest possible remaining channel being 60 MHz.

Figure 7:
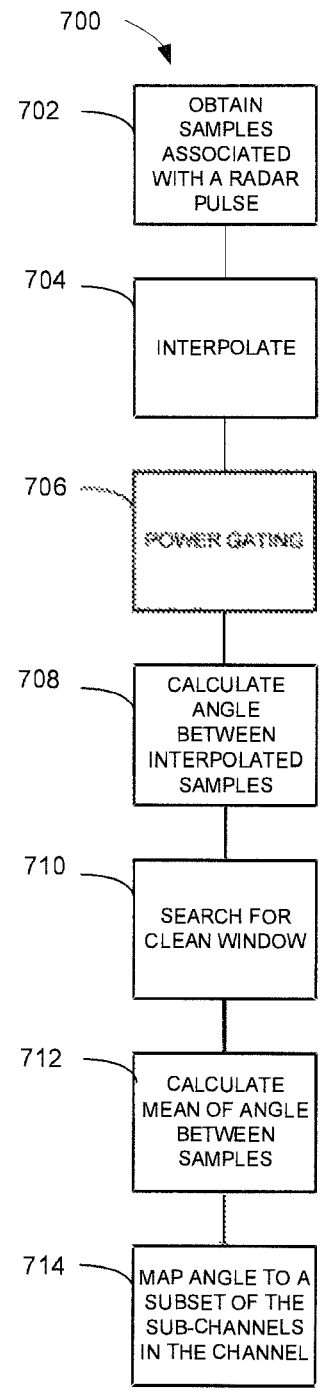
FIG. 7 is an example of a method for determining the frequency used by a primary user such as the frequency of a radar signal.

In view of the foregoing structural and functional features described above, methodologies in accordance with example embodiments will be better appreciated with reference to FIGS. 7 and 8. While, for purposes of simplicity of explanation, the methodologies of FIGS. 7 and 8 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the methodologies. The methodologies described herein are suitably adapted to be implemented in hardware, software when executed by a processor, or a combination thereof.

Figure 6:
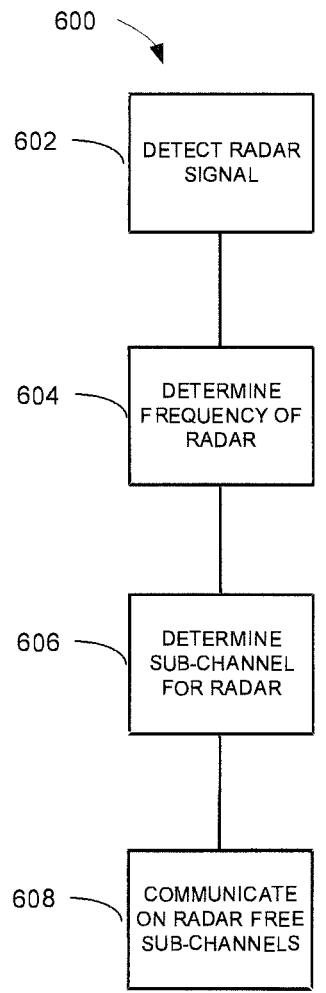
FIG. 6 is an example of a method that detects the presence of a primary user such as radar on a sub-channel belonging to a wideband channel containing a plurality of sub-channels.

FIG. 6 is a an example of a method 600 that detects the presence of a primary user such as, for example, radar on a sub-channel belonging to a wideband channel containing a plurality of sub-channels. The method 600 may be performed by the radar detection logic 204 (FIG. 2), spectrum analyzer 308 (FIG. 3), and/or computer system 400 (FIG. 4).

At 602, energy events for a time period are examined to determine whether pulses or other energy events indicative of the presence of a radar signal are found during the time period. A radar signal is determined to be present responsive to detecting pulses or other energy events indicative of the presence of a radar signal.

At 604, the frequency of the radar signal is determined. In an example embodiment, as will be described in more detail in FIG. 7, interpolated samples are generated, a start of pulse is located, and a mean of angles between samples for a plurality of samples is computed, and the angle corresponding to the mean is employed for converting from the time domain to the frequency domain.

At 606, a sub-channel corresponding to the frequency of the radar signal is determined. In an example embodiment, the sub-channel is determined by mapping the frequency of the radar signal to the plurality of sub-channels.

At 608, communication is allowed or otherwise enabled on radar free sub-channels. No communications are allowed or otherwise enabled on the sub-channel that corresponds to the frequency of the radar signal. In this regard, for example, communication on the sub-channel that corresponds to the frequency of the radar signal is disabled or otherwise not permitted. For example, in embodiments, the sub-channel may be removed from service, associated with data indicating that the sub-channel is not to be used, or the like to ensure non-interference with the sub-channel having the radar signal and also to enable use of more sub-channels without the radar signal. In particular embodiments, if the frequency of the radar signal is within a predetermined distance (frequency) of an adjacent channel, communications are not allowed on the adjacent channel. For example, if the estimated error in computing the radar signal is larger than the distance of the calculated radar signal from an adjacent channel, the adjacent channel is also determined to have radar present and is deemed an unavailable channel.

FIG. 7 is an example of a method 700 for determining the frequency being used by a detected primary user and, in particular, for determining the frequency of a detected radar signal. The method 700 may be performed by the radar detection logic 204 (FIG. 2), spectrum analyzer 308 (FIG. 3), and/or computer system 400 (FIG. 4).

At 702, a plurality of samples are obtained for a channel that contains a plurality of sub-channels. For example, for a 160 MHz channel that contains two 80 MHz channels, four 40 MHz channels, eight 20 MHz channels, or any combination of 20/40/80 MHz channels (e.g., one 80 MHz channel, one 40 MHz channel, two 20 MHz channels, etc.).

At 704, interpolated samples are calculated. The interpolated samples may be limited to a time period of particular interest (e.g., a time period where pulses indicative the start of a radar signal are detected). Interpolation changes the sampling period in time domain to a finer granularity (interpolating intermediate points).

At 706, power gating is employed to search for the start of a pulse that is saturating the ADC. At 708, the angle between interpolated samples is calculated.

At 710, a search for a clean window is made during a predetermined time period from the start of the pulse (e.g., the first 0.5 microseconds).

At 712, a mean of the plurality of angles between a plurality of I/Q samples is computed.

At 714, the frequency determined from the mean of the angle between the plurality of I/Q samples is mapped to a sub-channel or a sub-set of channels for a wideband channel that comprises a plurality of channels. The sub-channel, or set of sub-channels, can be marked as unavailable or are otherwise avoided.

FIGS. 8A and 8B illustrate an example of logic stored in non-transitory memory 408 and executable by a processor 404, wherein the logic is in a form of MATLAB code 800 for implementing an example embodiment. Those skilled in the art should readily appreciate that any suitable programming may be employed and that the example is for illustrative purposes.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. Logic encoded in a tangible, non-transitory computer readable medium for execution and when executed by a processor operable to:
   select a wide band channel comprising a plurality of sub-channels;
   obtain a plurality of samples on the wide band channel;
   determine a plurality of angles between the plurality of samples;
   determine a frequency of a primary user signal by filtering the plurality of angles;
   map the determined primary user signal to a first sub-channel of the plurality of sub-channels in accordance with the frequency of the primary user signal; and
   enable communication on a selected second sub-channel of the plurality of sub-channels that does not include the frequency of the primary user signal.

2. The logic set forth in claim 1, further operable to disable communication on the first sub-channel.

3. The logic set forth in claim 1, further operable to:
   mark the first sub-channel as being unavailable for communication by a secondary user; and,
   communicate the mark to an associated device.

4. The logic set forth in claim 1, further operable to determine whether the frequency of the primary user signal is within a predetermined limit of an adjacent sub-channel; and
   wherein the communication is enabled on a sub-channel selected from the plurality of sub-channels which does not include the adjacent sub-channel.

5. The logic set forth in claim 4, wherein the predetermined limit is based on a frequency estimation error of the primary user signal.

6. The logic set forth in claim 4, wherein the predetermined limit is based on a guard spacing selected to provide additional bandwidth protection to the primary user signal.

7. The logic set forth in claim 1, wherein filtering the plurality of angles comprises determining the mean of the plurality of angles.

8. The logic set forth in claim 1, further operable to:
   generate an interpolated sample by a non-linear interpolation algorithm employing at least two of the plurality of samples on both sides of the interpolated sample; and
   calculate an angle between the interpolated sample and one of the plurality of samples.

9. The logic set forth in claim 1, further operable to power gate to find a start of a pulse when an analog to digital converter (ADC) is saturated from the primary user signal.

10. The logic set forth in claim 1, further operable to find a clean window.

11. The logic set forth in claim 1, wherein the primary user signal comprises a radar signal.

12. An apparatus, comprising:
    a wireless transceiver; and
    radar detection logic operably coupled with the wireless transceiver and operable to obtain data representative of samples of a channel that contains a plurality of sub-channels;
    the radar detection logic is operable to select a time period having samples indicative of radar pulses;
    the radar detection logic is operable to determine a frequency of a radar signal associated with the radar pulses;
    the radar detection logic is operable to map the frequency of the radar signal to a sub-channel;
    the radar detection logic is operable to determine whether the frequency of the radar signal is within a predetermined limit of an adjacent sub-channel; and
    wherein the wireless transceiver selectively communicates on at least one sub-channel selected from the plurality of sub-channels that does not include the frequency of the radar signal.

13. The apparatus set forth in claim 12,
    wherein selectively communicating on a sub-channel selected from the plurality of sub-channels does not include the adjacent channel.

14. The apparatus set forth in claim 13, the radar detection logic is further operable to power gate to find a start of a pulse when an analog to digital converter (ADC) is saturated from the radar signal.

15. The apparatus set forth in claim 14, the radar detection logic is further operable to find a clean window.

16. The apparatus set forth in claim 15, the radar detection logic is further operable to obtain a difference of angles between the samples indicative of radar pulses.

17. The apparatus set forth in claim 16, the radar detection logic is further operable to determine a mean of the difference of angles between samples.

18. A method comprising:
    obtaining a plurality of samples for a channel, the channel containing a plurality of sub-channels;
    determining from the plurality of samples whether a pulse indicative of a radar signal is present;
    finding a start of the pulse;
    determining a plurality of angles between the plurality of samples;
    determining a mean of the angles to determine a frequency of the radar signal; and
    mapping the frequency of the radar signal to a sub-channel associated with a channel comprising a plurality of sub-channels.

19. The method of claim 18, further comprising:
    marking a sub-channel that maps to the frequency of the radar signal as unavailable.

20. The apparatus set forth in claim 12, further comprising a complex demodulator configured to output I/Q samples, wherein the plurality of samples comprises the I/Q samples.

* * * * *